Figure 1:
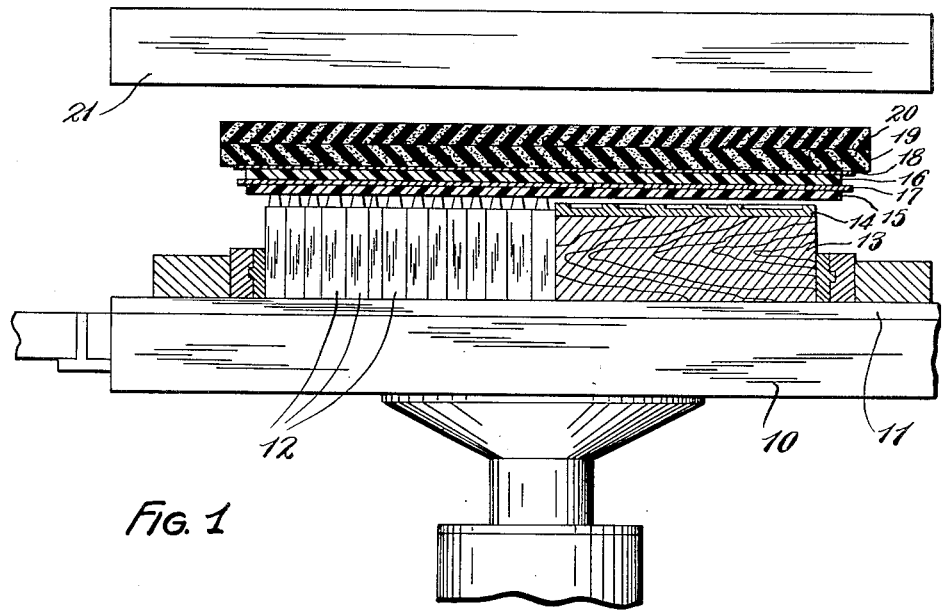

INVENTOR.
HOWARD G. SCHWARZ

Patented Dec. 11, 1951

2,578,209

UNITED STATES PATENT OFFICE 2,578,209

METHOD OF MAKING MOLDS FOR ELECTROTYPES

Howard G. Schwarz, Newbury, Ohio, assignor to The Art Electrotype Company, Cleveland, Ohio, a corporation of Ohio Application November 30, 1949, Serial No. 130,175

6 Claims. (Cl. 18—56)

This invention relates to improvements in a method of making electrotype molds, more particularly molds formed of thermoplastic sheets of vinyl acetate-vinyl chloride copolymer, or equivalent plastic material.

The conventional procedure followed in the making of such molds involves heating a sheet of thin plastic until it reaches the molding temperature, which is of the order of 200° to 230° F., placing the sheet upon the mold pattern which has been preheated, and covering the moldable sheet with one or more compressible, preferably resilient, rubber or rubber-like blankets. Pressure is then exerted to cause the thermoplastic sheet to flow sufficiently to enter the cavities of the pattern and conform closely to the surface contours thereof. This pressure is maintained until the thermoplastic material cools and sets. This method calls for the use of relatively high pressures, 250 lbs. to 700 lbs. per square inch, according to Kreber et al. Patent 2,400,518. If high pressures are not used the grain of the rubber blanket appears in the image impressed in the mold, which adversely affects the quality of the printing from the resulting electrotype.

I have discovered that much lower pressures are required and sharper images are obtained in the mold if two sheets of thermoplastic materials are used instead of one, and a sheet of tough grainless plastic material which is not affected by the molding heat is interposed between the two thermoplastic sheets. The second sheet of thermoplastic material is heated to the same temperature as the sheet which is to form the mold, and the molding pressure causes it to conform very roughly to the type or other molding pattern. The back surface of the second thermoplastic sheet takes the grain image of the rubber blanket, but that image is not transferred to its forward side to any appreciable extent.

An object of the invention therefore is the provision of a method of making molds for electrotypes from thermoplastic material which shall involve the application of relatively light pressures while producing sharp impressions and at the same time eliminating grain.

Another object is the provision of a method of making molds for electrotypes from combination lock-ups of type and wood mounted plates where the height of the latter is not precisely type high, without resorting to the usual methods of underlaying block mounted plates that are less than type high or of planing off the back surface of blocks that are more than type high.

In the drawing

Figure 2:
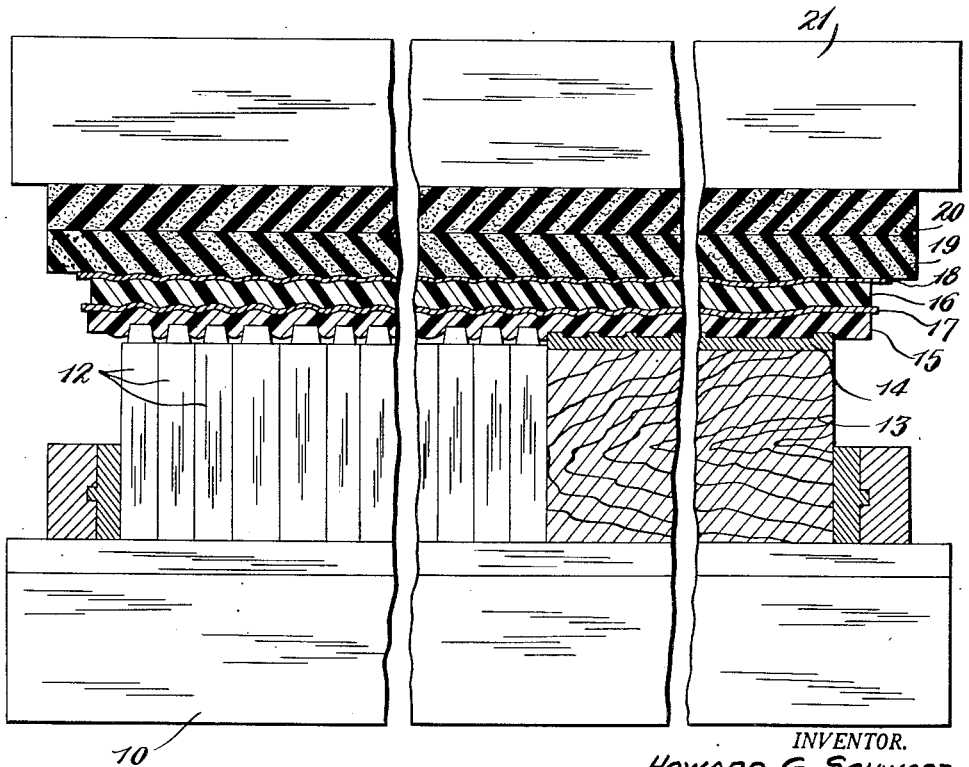

Fig. 1 is a more or less diagrammatic elevational view, partly in vertical section, of a press with a molding pattern bearing a moldable sheet and backing plates in place on the platen, and Fig. 2 is an enlarged view of the same after the molding pressure has been applied.

In the drawing the lower platen of a hydraulic press is shown at 10. Upon it is supported a plate 11 which carries the molding pattern. In the illustrated case this pattern comprises type elements 12 and a wood block 13 bearing an illustration form 14, such as an etching. The printing surfaces of the type and of the form 14 should be of the same height, but in practice there may be more or less deviation, and such a case is illustrated herein to an exaggerated degree. It has been common practice heretofore where the block supported plates are less than type high to spot the backs of the blocks 13 with make-ready in order to bring the printing surfaces to the same level. Similarly where the block mounted plates are more than type high it has been conventional practice heretofore to plane off the back surface of the blocks. This is unnecessary in the practice of my invention for differences in height of .008 of an inch or less. In carrying out the method the pattern is preheated to a temperature of 180° F. or thereabouts.

The thermoplastic sheet which is to constitute the mold is shown at 15 in the drawing. It is preferably vinyl acetate-vinyl chloride copolymer. In most cases a thickness of .030 of an inch is preferred, but other thicknesses are satisfactory in some instances. The second sheet of thermoplastic material 16, which may be somewhat thicker than sheet 15, is separated from sheet 15 by a thin sheet 17, one of whose functions is to prevent the two sheets 15 and 16 from adhering to each other. Preferably I employ for the purpose a sheet of tough compressible plastic that is grainless and is not affected by the molding heat of 200° to 230° F. The best material I have found for the purpose is polytetrafluoroethylene. It may be used repeatedly.

After the second sheet 16 is in place a sheet 18 of onionskin paper or other material of such nature as to provide a non-sticking surface is placed over sheet 16, after which an electric heater is lowered onto what I term the sandwich. The heater is left in place until the three sheets 15, 16, 17 are brought to the heat at which sheets 15, 16 become plastic, that it to say 200° to 230° F. Thereafter the heater is removed and a soft resilient blanket 19 of rubber or rubberized fabric which has been preheated is placed on the onionskin 18. Preferably a second blanket 20 of the same material is placed above blanket 19. These blankets are of the type conventionally employed for the purpose.

When the parts are in the position of Fig. 1, the mold pattern 12, 13 and the sheets 15 and 16 being heated as previously described, the press may be operated to advance platen 10 toward an upper platen 21 and finally to compress sheets 15, 16, 17, 18, 19 and 20 between platen 21 and the molding pattern 12, 14. The pressure exerted may be relatively low, that is of the order of fifty pounds per square inch, as compared with pressures of several hundred pounds used in prior methods. The pressure of course causes the thermoplastic material of sheet 15 to flow into the cavities of the pattern, and the thermoplastic material of sheet 16 follows this flow to a lesser degree. The tough sheet 17 smooths out the hills and valleys on the back of the sheet 15 to a considerable extent and transmits them in this form to sheet 16. In the latter sheet there is flow of the heated thermoplastic material which fills the uneven contours of sheet 17. Because of the internal flow of material in sheet 16 the upper surface of that sheet is smoother than its lower surface.

The grain of the rubber blanket 19 tends to be transmitted under pressure to the molded sheet 15 and to appear at the bases of the cavities formed in that sheet. In the methods of the prior art such grain may be eliminated by exerting very heavy pressure which tends to iron out the grain. In my method on the other hand the grain never reaches the forward surfaces of sheet 15, being absorbed almost altogether by the sheet 16. Thus a relatively light pressure gives results which are at least as good as any attained heretofore, and the useful life of the sheet 15 is increased considerably, it being possible to recondition the sheet and use it several times. Sheet 16, which does not receive any deep impressions, may be reused many times.

The remarkably low pressure which may be employed in the method to get a good mold is highly beneficial because the plastic molding material then has little tendency to lock under the serifs or overhanging tips of the type characters. Thus one is enabled to mold this kind of type matter and remove the hardened mold from the pattern without breaking the delicately cut type matter.

My method is particularly advantageous where the pattern consists of type matter and a block mounted plate locked together in a chase. Height differences between the two may be as great as .008 inch without necessitating unlocking of the chase and planing off the back of the block or spotting it with make-ready.

Having thus described my invention, I claim:

1. In the molding of molds for electrotypes having inset designs from sheets of moldable thermoplastic material, the method which consists in heating to a molding temperature two sheets of said thermoplastic material, placing that one of said sheets which is to form the electrotype mold upon a molding pattern with a relief design, upon that a thin sheet of tough, pliable grain free plastic resistant to a temperature higher than the molding temperature of said thermoplastic material upon that the other sheet of thermoplastic material, and upon that a resilient blanket having grain, pressing the blanket, sheets and pattern together, thereby deforming said first named moldable sheet to conform it closely to the contours of the molding pattern, said second thermoplastic sheet constituting a deformable backing for said first sheet and being deformed in corresponding areas to a lesser degree, and holding the said sheets, blanket and molding pattern under pressure until the first named moldable sheet has cooled and set.

2. The method defined in claim 1, wherein said sheet of tough, pliable plastic is polytetrafluoroethylene polymer.

3. The method defined in claim 1, wherein the second named sheet of thermoplastic material is thicker than the first named sheet.

4. The method as defined in claim 1, wherein both sheets of thermoplastic material are vinyl acetate-vinyl chloride copolymer.

5. The method defined in claim 1, wherein the pressure exerted in the molding step is of the order of forty to fifty pounds per square inch.

6. The method of making an electrotype mold having an inset design from a relief pattern the upper surfaces of which deviate from a constant height by as much as .008 of an inch, which comprises disposing the face of the molding pattern in contact with a moldable sheet of vinyl acetate-vinyl chloride copolymer thermoplastic material which is to form the electrotype mold, applying to the back of said moldable sheet a thin sheet of tough grain free pliable plastic that is unaffected by the molding temperature of said thermoplastic material, applying to the back of said heat resistant sheet a second sheet of vinyl acetate-vinyl chloride copolymer thermoplastic material, applying heat of the order of 200° to 230° F. for a length of time sufficient to render both sheets of thermoplastic material soft and moldable, applying a compressible blanket having grain to the back of said second named thermoplastic sheet, pressing the blanket, sheets and pattern firmly together, thereby deforming said first named moldable sheet to conform it closely to the surface contours of the molding pattern and approximately to the sub-surface contours thereof, and holding the said sheets, blanket and molding pattern under pressure until the said first named moldable sheet has cooled and set.

HOWARD G. SCHWARZ.

REFERENCES CITED

The following references are of record in the file of this patent:

UNITED STATES PATENTS

| Number | Name | Date |
|---|---|---|
| 2,070,023 | Olsen | Feb. 9, 1937 |
| 2,276,035 | Guhl | Mar. 10, 1942 |
| 2,310,619 | Dillehay | Feb. 9, 1943 |
| 2,400,518 | Kreber | May 21, 1946 |
| 2,536,316 | Schwarz et al. | Jan. 2, 1951 |